US007642507B2

(12) United States Patent
Radtke et al.

(10) Patent No.: US 7,642,507 B2
(45) Date of Patent: Jan. 5, 2010

(54) APPARATUS AND METHODS FOR INTERLACED DENSITY AND NEUTRON MEASUREMENTS (75) Inventors: Richard J. Radtke, Pearland, TX (US); Michael Evans, Missouri City, TX (US); Charles Flaum, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 342 days.

(21) Appl. No.: 11/307,632

(22) Filed: Feb. 15, 2006

(65) Prior Publication Data
US 2006/0192096 A1    Aug. 31, 2006

Related U.S. Application Data (60) Provisional application No. 60/657,180, filed on Feb. 28, 2005.

(51) Int. Cl.
G01V 5/12    (2006.01)
(52) U.S. Cl. ............... 250/256; 250/269.3; 250/265; 250/261
(58) Field of Classification Search ............ 250/269.2, 250/265, 256, 261, 269.3
See application file for complete search history.

(56) References Cited

U.S. PATENT DOCUMENTS

| 2,345,119 | A | 3/1944 | Hare |
|---|---|---|---|
| 2,475,137 | A | 7/1949 | Herzog |
| 2,648,780 | A | 8/1953 | Herzog |
| 2,761,977 | A | 9/1956 | McKay |
| 2,763,788 | A | 9/1956 | Herzog |
| 2,934,652 | A | 4/1960 | Caldwell et al. |
| 3,073,958 | A | 1/1963 | Youmans |
| 3,321,625 | A | 5/1967 | Wahl |
| 3,321,627 | A | 5/1967 | Tittle |

(Continued)

FOREIGN PATENT DOCUMENTS

EP    0072304    2/1983

(Continued)

OTHER PUBLICATIONS

Balo, P.A.; Knauer, J.B.; Martin, R.C. "Production, Distribution, and Applications of Californium-252 Neutron Sources" Oct. 3, 1999 ORNL/CP-102606.*

(Continued)

*Primary Examiner*—David P Porta
*Assistant Examiner*—Jessica L Eley
(74) *Attorney, Agent, or Firm*—Darla Fonseca; Jaime Castano (57) ABSTRACT

A tool for formation logging includes a support configured for movement in a borehole; a source mounted on the support, the source configured to emit neutrons and gamma rays; and at least one sensor mounted on the support and spaced apart from the source, wherein the at least one sensor is configured to detect at least one selected from the group consisting of gamma rays and neutrons. A method for formation logging in accordance with one embodiment of the invention includes emitting neutrons and gamma rays into a formation, using a source on a logging tool disposed in a borehole penetrating the formation; and detecting gamma-ray signals and neutron signals scattered by the formation, using at least one detector on the logging tool.

10 Claims, 4 Drawing Sheets

U.S. PATENT DOCUMENTS

| | | | | |
|---|---|---|---|---|
| 3,435,217 | A | 3/1969 | Givens | |
| 3,453,433 | A | 7/1969 | Alger et al. | |
| 3,483,376 | A | 12/1969 | Locke et al. | |
| 3,491,238 | A | 1/1970 | Allen | |
| 3,509,346 | A | 4/1970 | Mills, Jr. et al. | |
| 3,566,117 | A | 2/1971 | Tixier | |
| 3,566,118 | A | 2/1971 | Peters | |
| 3,662,173 | A | 5/1972 | Youmans | |
| 3,789,219 | A | 1/1974 | Wilson | |
| 3,971,935 | A | 7/1976 | Nelligan | |
| 4,005,200 | A | 1/1977 | Utsumi et al. | |
| 4,048,495 | A | 9/1977 | Ellis | |
| 4,055,763 | A | 10/1977 | Antkiw | |
| 4,122,339 | A | 10/1978 | Smith, Jr. et al. | |
| 4,122,340 | A | 10/1978 | Smith, Jr. et al. | |
| 4,152,590 | A | 5/1979 | Smith, Jr. et al. | |
| 4,362,939 | A * | 12/1982 | Horiuchi et al. | 250/358.1 |
| 4,379,228 | A | 4/1983 | Allen | |
| 4,381,449 | A | 4/1983 | Smith | |
| 4,387,302 | A | 6/1983 | Givens | |
| 4,409,481 | A | 10/1983 | Smith, Jr. et al. | |
| 4,436,996 | A | 3/1984 | Arnold | |
| 4,446,368 | A | 5/1984 | Koenn et al. | |
| 4,454,420 | A | 6/1984 | Smith, Jr. | |
| 4,529,877 | A | 7/1985 | Arnold | |
| 4,568,829 | A | 2/1986 | Ruckebusch | |
| 4,618,765 | A | 10/1986 | Sonne | |
| 4,631,405 | A | 12/1986 | Smith, Jr. | |
| 4,645,926 | A | 2/1987 | Randall | |
| 4,691,102 | A | 9/1987 | Schultz et al. | |
| 4,760,252 | A | 7/1988 | Albats et al. | |
| 4,814,611 | A | 3/1989 | Moake | |
| 4,879,463 | A * | 11/1989 | Wraight et al. | 250/269.2 |
| 4,904,865 | A * | 2/1990 | Meisner et al. | 250/254 |
| 4,947,040 | A | 8/1990 | Mahdavi et al. | |
| 5,235,185 | A | 8/1993 | Albats et al. | |
| 5,313,504 | A | 5/1994 | Czirr | |
| 5,377,105 | A | 12/1994 | Smith | |
| 5,390,115 | A | 2/1995 | Case et al. | |
| 5,434,408 | A | 7/1995 | Smith, Jr. et al. | |
| 5,459,314 | A | 10/1995 | Plasek | |
| 5,539,225 | A | 7/1996 | Loomis | |
| 5,608,215 | A * | 3/1997 | Evans | 250/269.6 |
| 5,699,246 | A | 12/1997 | Plasek et al. | |
| 5,767,510 | A * | 6/1998 | Evans | 250/269.1 |
| 6,032,102 | A | 2/2000 | Wijeyesekera et al. | |
| 6,376,838 | B1 | 4/2002 | Odom | |
| 6,389,367 | B1 | 5/2002 | Plasek | |
| 6,495,837 | B2 | 12/2002 | Odom et al. | |
| 6,639,210 | B2 | 10/2003 | Odom et al. | |
| 6,703,606 | B2 | 3/2004 | Adolph | |
| 6,754,586 | B1 | 6/2004 | Adolph | |
| 7,361,886 | B2 * | 4/2008 | Stoller et al. | 250/269.1 |
| 2003/0178560 | A1 | 9/2003 | Odom et al. | |
| 2004/0222368 | A1 * | 11/2004 | Odom et al. | 250/269.2 |

FOREIGN PATENT DOCUMENTS

| | | |
|---|---|---|
| GB | 862434 | 3/1961 |
| GB | 1405299 | 9/1975 |
| GB | 2087072 | 5/1982 |
| GB | 2117901 | 10/1983 |
| WO | WO2004/081605 | 9/2004 |

OTHER PUBLICATIONS

Wilson, Robert D., "Bulk Density Logging with High-Energy Gammas Produced by Fast Neutron Reactions with Formation Oxygen Atoms," 1995 IEEE Nuclear Science Symposium, pp. 1-5.

* cited by examiner

APPARATUS AND METHODS FOR INTERLACED DENSITY AND NEUTRON MEASUREMENTS

CROSS-REFERENCE TO RELATED APPLICATIONS

This claims priority of U.S. Provisional Application Ser. No. 60/657,180, filed on Feb. 28, 2005, which is incorporated by reference in its entirety. This is related to co-pending applications, entitled: "Sigma/Porosity Tools with Neutron Monitors", and "Corrections of Gamma-Ray Responses" both filed concurrently with this document and assigned to the present assignee.

BACKGROUND OF INVENTION

1. Field of the Invention

The invention relates to well logging with nuclear tools. In particular, it relates to apparatus and methods for the determination of formation properties using neutron and gamma-ray measurements.

2. Background Art

The characteristics of geological formations are of significant interest in the exploration and production of subsurface water and mineral deposits, such as oil and gas. Many characteristics, such as the hydrocarbon volume, porosity, lithology, reservoir location, and permeability of a formation, may be deduced from certain measurable quantities. Among these quantities are: density, porosity, photoelectric factor (Pe), hydrogen index, salinity, and thermal neutron capture cross section (Sigma). These quantities are typically measured by logging-while-drilling (LWD) or wireline tools that include gamma-ray and/or neutron detectors.

Nuclear logging tools often carry nuclear energy sources that radiate or emit energy into the formation. One or more detectors on these tools then detect signals that result from interactions between formation materials and the radiation. Detected signal data are typically transmitted uphole, temporarily stored downhole for later processing, or combined in both techniques, to evaluate the geological formation from which the data was gathered. Typically, once uphole, these data are used in one or more formation evaluation models to derive the desired formation properties. Formation models are typically software programs used to evaluate the geological formation from which the data was gathered. The petroleum industry uses various tools to obtain measurements for estimating earth formation properties. These measurements are often used in combination to derive the formation properties. For example, the formation density is often combined with other measurements (e.g., neutron porosity measurements and resistivity measurements) to determine gas saturation, lithology, porosity, the density of hydrocarbons within the formation pore space, properties of shaly sands, and other parameters of interest.

Gamma-ray tools for formation density measurements are based on detecting Compton scattered gamma-rays in one or more gamma-ray detectors installed at a suitable distance from a neutron, gamma-ray, or x-ray source. The number of Compton scattering collisions within the formation and the resulting attenuation of the radiation is related to electron density of materials within the formation. Thus, the signals detected by such tools can be analyzed to derive formation electron density. Through calibration, the electron density of the formation can be related to true bulk density of the formation.

The first density measurements were made with single-detector tools. However, these tools had no capability to compensate for borehole effects. The limitations inherent in the single-detector approach have led to the development of modern dual-detector density tools, in which compensation is based on a short-spacing (SS) and a long-spacing (LS) detectors. See, e.g., U.S. Pat. Nos. 5,390,115, 5,596,142, 6,376,838, 5,528,029, and 4,691,102

Gamma rays may also be recorded with their energies (frequencies) to provide gamma-ray spectra. Such spectral measurements can be used to correct the apparent formation density for the formation Pe in each detector. The idea that spectral measurements from a single detector can be used to correct undesired interference in principle can also be applied to a borehole-compensated density. While this theoretical possibility has been around for at least fifteen years, currently there is no working borehole-compensated, single-detector density tool available.

As with density tools, the first neutron tools were single-detector tools without borehole compensation. Dual-spacing tools arose some time later, giving rise to the possibility of removing some of the sensitivity of the measurement to environmental effects. Standard techniques for accomplishing the compensation are the ratio-based method and a spine-and-ribs approach borrowed from the density tools. More recently, an improved ratio-based method referred to as borehole-invariant porosity has been developed, as disclosed in U.S. Pat. No. 5,767,510. However, unlike most gamma-ray detectors, present-day neutron detectors used in the oilfield service business do not measure the energy deposited by the incoming neutron. The current state of the art does not permit a borehole-compensated, single-detector neutron measurement.

Because gamma-ray tools and neutron tools measurement different formation properties, these tools are often used together in the same logging operations. When gamma-ray detectors are used together with neutron sources, care must be taken to avoid or minimize neutron-induced interference in the gamma-ray measurements. Currently, there are no methods available to correct for this kind of interference. Therefore, these detectors are often deployed on separate tool sections with a great distance between the neutron source and the gamma-ray detectors. This makes the tool string unnecessarily long.

SUMMARY

One aspect of the invention relates to tools for formation logging. A tool for formation logging in accordance with one embodiment of the invention includes a support configured for movement in a borehole; a source mounted on the support, the source configured to emit neutrons and gamma rays; and at least one sensor mounted on the support and spaced apart from the source, wherein the at least one sensor is configured to detect at least one selected from the group consisting of gamma rays and neutrons.

Another aspect of the invention relates to methods for formation logging. A method for formation logging in accordance with one embodiment of the invention includes emitting neutrons and gamma rays into a formation, using a source on a logging tool disposed in a borehole penetrating the formation; and detecting gamma-ray signals and neutron signals scattered by the formation, using at least one detector on the logging tool.

Another aspect of the invention relates to methods for formation logging. A method for formation logging in accordance with one embodiment of the invention includes emitting nuclear energy into a formation, using a source on a logging tool disposed in a borehole penetrating the formation; detecting signals scattered by the formation using a gamma-ray detector on the logging tool, the signals being associated with the emitted energy; deriving a correction signal using high-energy signal spectra from the detected signals; and applying the correction signal to the detected signals to correct for neutron interference and/or borehole effects on the detected signals.

Other aspects and advantages of the invention will be apparent from the following description and the appended claims.

DETAILED DESCRIPTION

Embodiments of the invention relate to apparatus and methods for determining formation properties using both gamma-ray and neutron measurements. The measurements may be used to determine an indication of formation density, porosity, and/or formation lithology, for example. Tools in accordance with embodiments of the invention have one or more sources that can emit gamma-rays and neutrons. These tools have gamma-ray detectors interlaced with neutron detectors or have detectors that are capable of measuring both gamma-rays and neutrons. Tools in accordance with embodiments of the invention have significantly shorter overall lengths.

Gamma-ray and neutron measurements are generally sensitive to environmental effects, such as the position of the logging tool in the borehole and the physical properties of the drilling fluid. For example, in neutron porosity measurements, the size of the borehole, the amount of stand-off of the tool from the borehole, the hydrogen index and salinity of the drilling fluid, and the salinity of the formation fluids, to name just a few, all affect the accuracy of the measurements. Similarly, in gamma-gamma density measurements, which have relatively shallow depths of investigation but are strongly focused, stand-off and drilling mud may have significant impact on the accuracy of the density measurements.

These environmental effects and their corrections can be best illustrated in gamma-gamma density logging. J. S. Wahl, J. Tittman, and C. W. Johnstone introduced a method of density measurement using an isotopic gamma ray source (e.g., $^{137}Cs$) and two gamma ray detectors (scintillation counters), in "The Dual Spacing Formation Density Log", Journal of Petroleum Technology, December 1964. The basic concepts disclosed by Wahl et al. are still in use today. Such a gamma-ray tool typically consists of a chemical source of gamma rays and two gamma ray detectors placed at different distances from the source. The detector placed further away from the source, called the long-spaced (LS) detector, provides the primary measurement. The detector closer to the source, called the short-spaced (SS) detector, provides a correction signal for environmental effects near the tool body. Appropriate combination of the signals from the SS and LS detectors provides a compensated density that is less sensitive to effects like tool standoff from the formation and mud cake located between the tool and the formation. Because of the relatively shallow depth of investigation of the density measurement and its sensitivity to elements of high atomic number typically found in drilling fluids and mud cakes, this compensation is crucial to the accuracy of the measurement.

Figure 1:
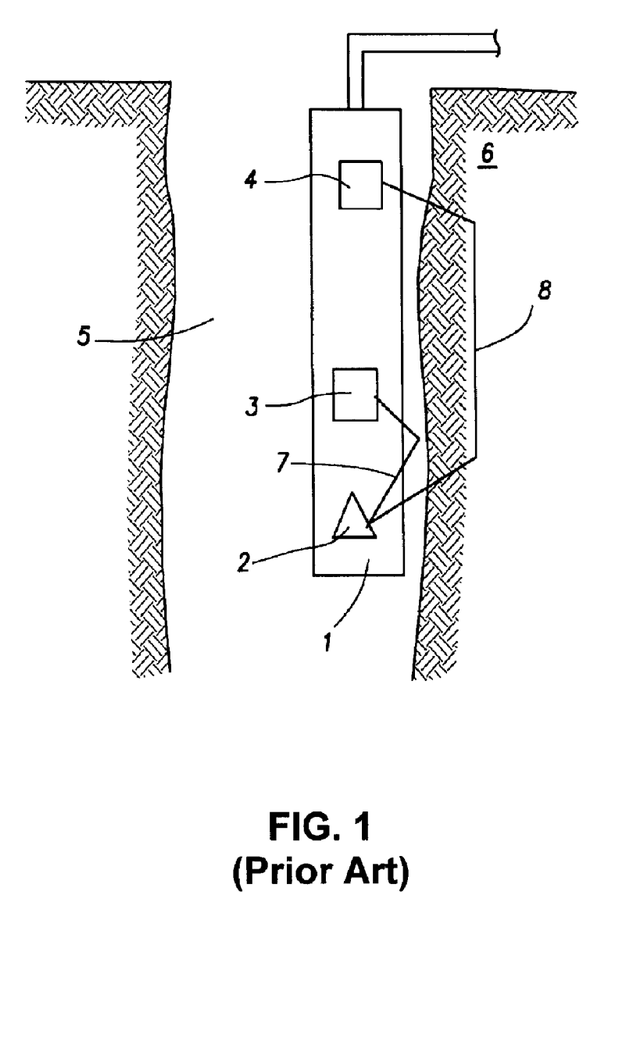
FIG. 1 shows a schematic of a conventional density tool including two gamma-ray detectors and a gamma-ray source.

FIG. 1 shows a schematic of a basic layout for a two detector gamma-ray logging tool (a density tool) disposed in a borehole. The density logging tool 1 consists of a short spaced (SS) gamma-ray detector 3 and a long spaced (LS) gamma-ray detector 4. In addition, the gamma-ray density tool 1 also includes a gamma ray source 2. The logging tool is disposed in a borehole 5 penetrating a formation 6. The LS detector 4 will detect mostly gamma rays that are emitted by the source 2 and scattered back to the tool 1 by the formation 6, as illustrated by path 8. The SS detector 3 will detect signals from near wellbore regions, as illustrated by path 7. Therefore, the signals detected by the SS detector 3 may be used to provide wellbore effect correction in the signals detected by the LS detector 4. One of ordinary skill in the art would appreciate that the logging tool may be a wireline tool, a slick-line tool, a logging-while-drilling (LWD) tool, a measurement-while-drilling (MWD) tool, or a logging-while-tripping (LWT) tool.

Density and Pe are typically obtained from gamma-ray measurements. Porosity can be obtained from the a gamma-ray tool described above or from a measurement based on neutrons. Neutron tools measure hydrogen content of the formation. Since pore fluids in the formation account for the majority of the hydrogen contents in the formation, the hydrogen content (or hydrogen index) of the formation can be interpreted as porosity of the formation. The advantage of using both gamma- and neutron-derived porosities is that a number of large environmental effects have the opposite effect on the two measurements, allowing a certain degree of additional compensation. The combination is also effective in detecting gas or determining clay content.

Neutron measurements are usually obtained with separate neutron tools. Neutron tools each contain a neutron source, which may be chemical or electrical, and at least two neutron detectors placed at different distances from the source. As with gamma-ray density measurements, the detector(s) in a neutron tool further from the source provides primary measurements for deriving formation porosity, while the detector(s) closer to the source provides information for near-tool environmental effect compensations. Conventionally, this compensation is achieved by taking the ratio of the count rate in the near to that in the far detector(s). This compensation is not perfect, and explicit corrections for various environmental parameters must be applied before an accurate answer can be obtained. Among the many environmental factors which affect the neutron measurement are the size of the borehole and the standoff of the tool from the formation.

As noted above, gamma-ray tools are often used together with neutrons tools because they each provide different indications of formation properties. When gamma-ray density tools are used with neutron tools, interference from the neutron source is possible. Conventionally, this interference is minimized by maintaining a long spacing between the gamma-ray detectors and the neutron sources.

Figure 2:
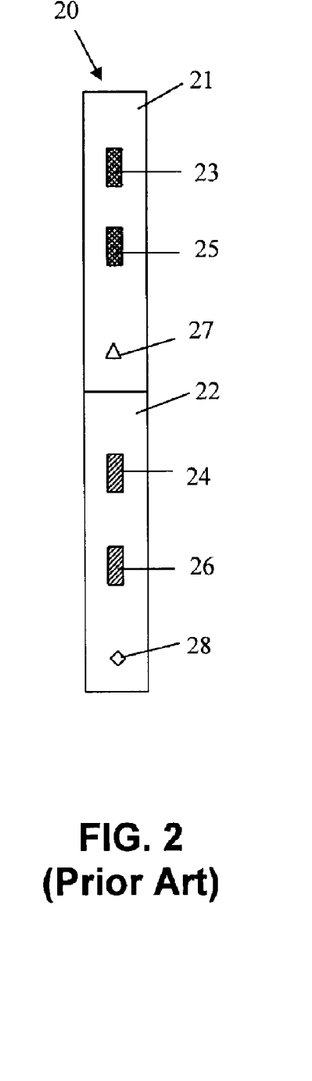
FIG. 2 shows a conventional tool string that includes a neutron tool and a density tool on separate housings.

FIG. 2 shows a typical tool string 20 with a neutron tool 22 and a gamma-ray density tool 21 in different housings next to each other. The gamma-ray tool 21 includes a source 27, a short spacing detector 25 and a long spacing detector 23. The neutron tool 22 includes a source 28, a short spacing detector 26, and a long spacing detector 24. In this conventional set up, the distance between the neutron source and the gamma-ray detectors is preferably large enough such that the interference is negligible.

Density and neutron tools are usually placed at least 7 ft (2.3 meters) apart (e.g., the distance between the gamma-ray detector 25 and the neutron source 28). This separation is necessary for at least two reasons. The first pertains to interference between the measurements. Gamma rays can directly produce signals in neutron detectors. Neutrons, either through capture, inelastic scattering, or activation of the drilling fluid or formation, can produce gamma rays which can generate signals in gamma ray detectors. Both types of processes can reduce the signal-to-noise ratio of the measurement and degrade its accuracy. The second reason relates to the requirement for compensated measurements. The physics of the density and neutron measurements dictate certain optimal positions of the detectors relative to the sources. These positions and the sizes of the detectors themselves make it physically difficult to place the detectors of the density and neutron measurements in close proximity inside a generally small-diameter logging tool.

Due to these limitations, logging tools are longer than required by electrical and mechanical constraints. Longer tools are also more expensive, heavier, and more difficult to handle at the well site. The large number of radiation detectors, which are often the most expensive and failure-prone components of the logging tools, increases the cost and reduces the reliability and maintainability of these tools. Moreover, the physical separation of the neutron and density measurements require that the results be depth-shifted and resolution-matched before they can be interpreted, and these procedures can introduce additional error.

Embodiments of the invention provide tools that are much shorter than conventional tools for both neutron and gamma-ray measurements. Tools in accordance with embodiments of the invention may have interlaced gamma-ray and/or neutron detectors on the same housing. In addition, these detectors may be placed close to a source that emits both neutrons and gamma rays. The interference between the density and neutron measurements is minimized through tool design, and the residual effect removed algorithmically. Therefore, embodiments of the invention can measure a combination of formation properties (such as density, Pe, and porosity) using a single, short tool.

Figure 3:
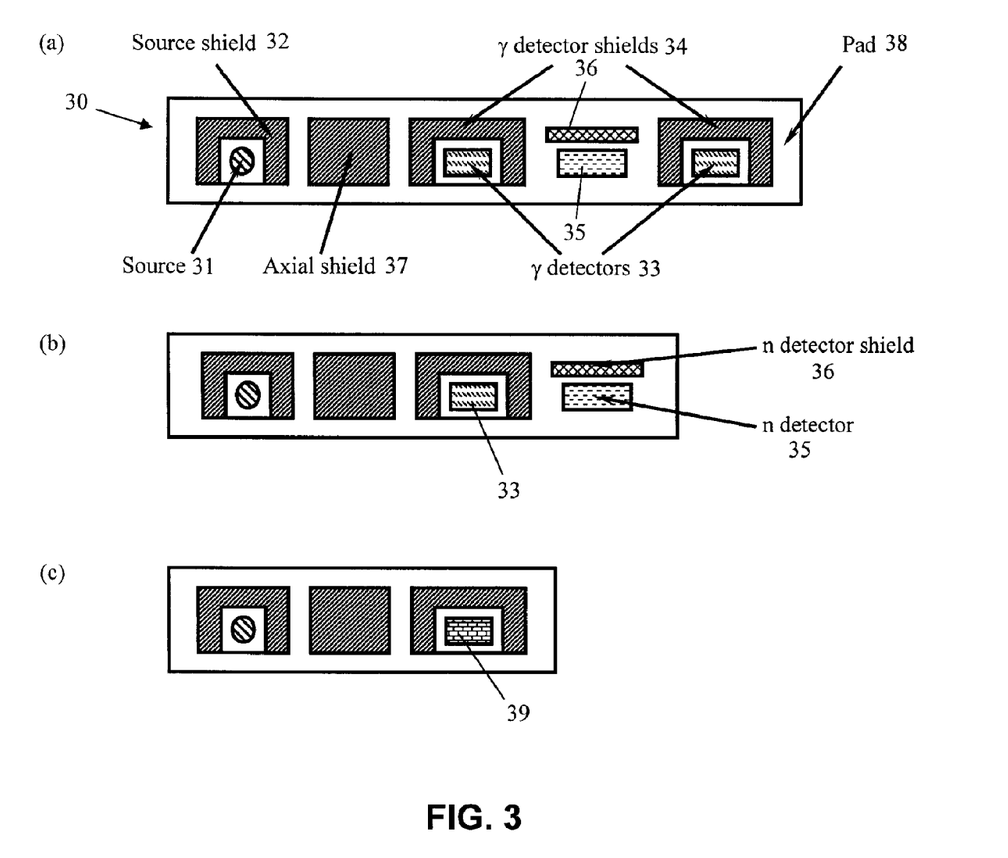
FIG. 3A shows a tool in accordance with one embodiment of the invention.
FIG. 3B shows a tool in accordance with one embodiment of the invention.
FIG. 3C shows a tool in accordance with one embodiment of the invention.

FIG. 3A-3C show three exemplary tools in accordance with embodiments of the invention. These tools each include a source that can emit neutrons and gamma rays. Various types of radiation sources have been used in well logging systems. For example, neutrons or gamma rays may be generated simply through the use of radiation sources based on radioactive isotopes (which naturally decay over time). Alternatively, an x-ray source may be used to replace a gamma-ray source, and neutrons may be generated through the controlled collision of energized particles in a manner analogous to a fusion reactor, such as a (d-T) generator commonly used in the art. Such a system is commonly referred to as a neutron generator. In most applications, the neutron generator is "pulsed", i.e. it emits pulses of neutrons followed by intervals during which no neutrons are emitted. When using such a pulsed neutron generator, the formation surrounding the well logging instrument is subjected to repeated, discrete "bursts" of neutrons.

There are several ways to create a source that can emit neutrons and gamma-rays for use in a tool of the invention. These sources may be chemicals (radioactive materials) or electronics (e.g., X-ray or neutron generators—such as a d-T generator that generates neutrons at about 14 MeV). Among the chemical sources, the easiest is to place independent neutron and gamma ray chemical sources in the same tool housing, preferably in close proximity. Any conventional logging neutron and gamma sources may be used, such as AmBe for neutron sources and $^{137}Cs$ for gamma ray sources. In addition, for convenience in loading and unloading the sources, the neutron and gamma ray sources may be mechanically coupled. An alternative source may be obtained by mixing two or more radioactive materials into a single capsule, at least one of which has a large neutron flux and at least one of which has a large gamma ray flux. A third possible source is to use a radioactive material, decay products of which include both neutrons and gamma rays. An example of such a radioactive material is $^{252}Cf$. In addition to these chemical sources, a tool of the invention may also use an X-ray generator as a gamma-ray source and/or a neutron generator as a neutron source. Using the pulsed operation of the neutron and/or x-ray source may aid in the discrimination between the neutron and gamma-ray induced responses.

The tool 30 shown in FIG. 3A comprises dual detectors 33 for gamma rays (density) and a single detector for neutrons 35. These detectors 33, 35 may be disposed on a pad 38, that may be urged against the wellbore. With this tool 30, neutrons and gamma rays are emitted from the source 31 into the formation (not shown). Some of the emitted gamma rays interact with matter in the formation and are scattered as a result of such interactions. The scattered gamma rays are then detected by one of the two dedicated gamma ray detectors 33. Similarly, the emitted neutrons may interact with matter in the formation and are scattered back to the tool. These scattered neutrons are detected by the single dedicated neutron detector 35.

From the signals in the two gamma-ray detectors 33, borehole-compensated measurements of the density and Pe of the formation may be obtained using techniques known in the art, such as spine-and-ribs. The interference effects of the neutrons on the density measurement are minimized by optimizing the sizes and compositions of the gamma ray detectors 33. One of ordinary skill in the art would appreciate that a larger gamma-ray detector will be needed for weaker signals, while a smaller detector may be used for stronger signals. Therefore, a judicial choice of a proper size of a gamma-ray detector may provide a good compromise between the desired sensitivity and the degree of interference. A gamma ray detector, in accordance with embodiments of the invention, may comprise any suitable type of detectors, such as NaI, BGO, CsI, anthracene, etc., see U.S. Pat. Nos. 4,647,781 and 4,883,956. The scintillator type detectors are typically coupled to photomultipliers (or other suitable photon detection devices) suited for well logging applications. The gamma-ray detectors may be operated in a plateau mode. Alternatively, the gamma-ray detectors may be used to measure gamma-ray spectra.

To further reduce the interference, the source 31 may be shielded with a source shield 32. Similarly, a gamma-ray detector shield 34 may be used around the gamma-ray detectors 33, and a neutron detector shield 36 may be used around the neutron detector 35. Shielding 37 may also be applied in the space between the source 31 and the gamma-ray detector 33 to reduce the direct neutron flux from the source 31 to the detector 33 and also prevent gamma-rays originating near the source 31 inside and outside the tool from traveling to the detector 33. Any material known in the art for such shielding may be used. Preferred materials for the shielding, for example, may include tungsten (for shielding of high energy neutrons and gamma-rays), materials containing a high concentration of hydrogen (e.g., Ti hydride or organic compounds) to moderate intermediate energy neutrons (i.e., neutrons with an energy below several MeV), and materials containing a high concentration of $^{10}$B (either using natural boron, or boron enriched with $^{10}$B) or cadmium. In accordance with embodiments of the invention, the shields may comprise a mix of different shielding materials. In addition to judicial selection of the shielding materials, the construction of shields may also be improved to enhance their performance. For example, in accordance with some embodiments of the invention, multiple layers of different shielding materials may be used to optimize the shielding performance.

Residual interference effects may be removed by utilizing signals either external or internal to the gamma ray detectors. An example of an external scheme is to apply a correction factor to the density signals, wherein the correction factor is related to the signals measured by the neutron detector. An example of an internal scheme is to apply a correction factor to the density signal, wherein the correction factor is related to the magnitude of the high-energy gamma rays detected by the gamma-ray detectors. The high-energy gamma rays are principally derived from neutron interactions.

From the signal detected by the neutron detector, an indication of porosity can be obtained. Typically, density measurements are run with a borehole caliper. Additionally, the signals detected by the density detectors (gamma-ray detectors) can be combined to give an indication of tool standoff. This information can be used to correct the single-detector neutron measurement for environmental effects, yielding an answer comparable in accuracy to a dual-neutron-detector measurement. By using a gas-filled neutron detector such as a $^3$He-filled proportional counter and placing it at a sufficient distance from the source, the interference effects of the gamma rays on the neutron measurement are minute and can be safely neglected.

Embodiments of the invention can also be implemented to produce borehole-compensated measurements free of (or with minimal) interference. As an example, the energy spectrum of each gamma ray detector 33 can be divided into a number of windows, each of which is more or less sensitive to formation or mud density, formation or mud photoelectric absorption, tool standoff, and neutron interference. A forward model for each window may be constructed, which is parameterized by these quantities. A similarly parameterized forward model may be constructed for the signals detected by the neutron detector. A joint inversion of all these measurements for these parameters may then be achieved, which would provide the desired compensated quantities in addition to quantifying some of the borehole effects. Techniques of this kind aimed at determining the density in multi-detector tools are well known in the art. See e.g., Allioli, F., Faivre, O., Jammes, L., and Evans, M., 1997, "A new approach to computing formation density and Pe free of mudcake effects," *Transactions of the SPWLA 38$^{th}$ Annual Logging Symposium*, Houston, Tex., USA (June), Paper K.

Figure 4:
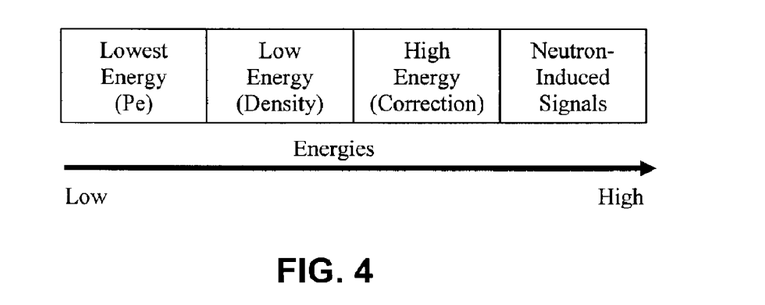
FIG. 4 shows a schematic illustrating various energy regions in the detected spectrum that can be used to derive formation properties.

The tool shown in FIG. 3B comprises a single gamma-ray detector 33 for density measurements and a single neutron detector 35 for neutron measurements. The embodiment shown in FIG. 3B takes the tool of FIG. 3A one step further, eliminating the gamma ray detector furthest from the source. A second gamma ray detector is not required in order to produce a borehole-compensated density measurement. By using spectral information at higher energies than the typical density window, yet lower than most of the neutron-induced gamma rays, a shallow correction signal can be obtained and applied to the deeper signal from the standard density window. Another energy window of even lower energy than the density window can be employed to measure the Pe of the formation. FIG. 4 shows a schematic illustrating the four energy regions of a gamma-ray spectrum. Thus, the single detector can provide the same measurements as the dual-detector configuration and allows for the correction of the neutron interference effects by the means discussed above. Due to the closer proximity of the detector to the source, the density detector may be made smaller and more heavily shielded to reduce the magnitude of the neutron interference.

If the density detector (shown as 33 in FIG. 3A or 3B) has a sufficient sensitivity in the high-energy part, it may also be used to perform neutron detection. In this case, the gamma-ray detector 39 may be used for both gamma-ray and neutron detection, and the neutron detector (shown as 35 in FIG. 3A or 3B) itself may be eliminated. This configuration is shown in FIG. 3C. Examples of gamma-ray detectors suitable for this purpose include scintillator crystals that contain neutron absorbers to detect both neutrons and gamma rays. Such scintillators, for example, include $Gd_2SiO_5$ (GSO) scintillator (including GSO doped with other metals—e.g., cerium) and $RbGd_2Br_7$:Ce scintillators. See e.g., Konishi, D., Uozumi, Y., Yoshida, H., and Matoba, M., 1999, "Response of GSO scintillator to thermal neutrons," *Nuclear Instruments and Methods in Physics Research A*, Vol. 420, pp. 467-472; and Shah, K. S., Cirignano, L., Grazioso, R., Klugerman, M., Bennett, P. R., Gupta, T. K., Moses, W. W., Weber, M. J., and Derenzo, S. E., 2002, "RbGd2Br7:Ce scintillators for gamma ray and thermal neutron detection," *IEEE Transactions in Nuclear Science*, Vol. NS-49, pp. 1655-1660. Although a tool in accordance with the embodiment shown in FIG. 3C is the most compact, all embodiments discussed above have several advantages over the prior art tools.

Such scintillators will be able to detect gamma rays having energies spanning from the low-energy region up to the high-energy region, as well as thermal neutrons (see e.g., FIG. 4). Such measurements may be divided into four spectral regions illustrated in FIG. 4, which are principally sensitive to photoelectric (Pe), deep density, shallow density, and neutron-induced effects. These spectral analyses can provide corrections of environmental effects in the desired measurements as described above. For example, the shallow density region may be used to correct borehole effects from the deep density region. Similarly, the neutron region can also provide correction for any neutron induced effect in the deep density measurements. After such corrections, these measurements can provide information on formation density, Pe, and porosity.

Figure 5:
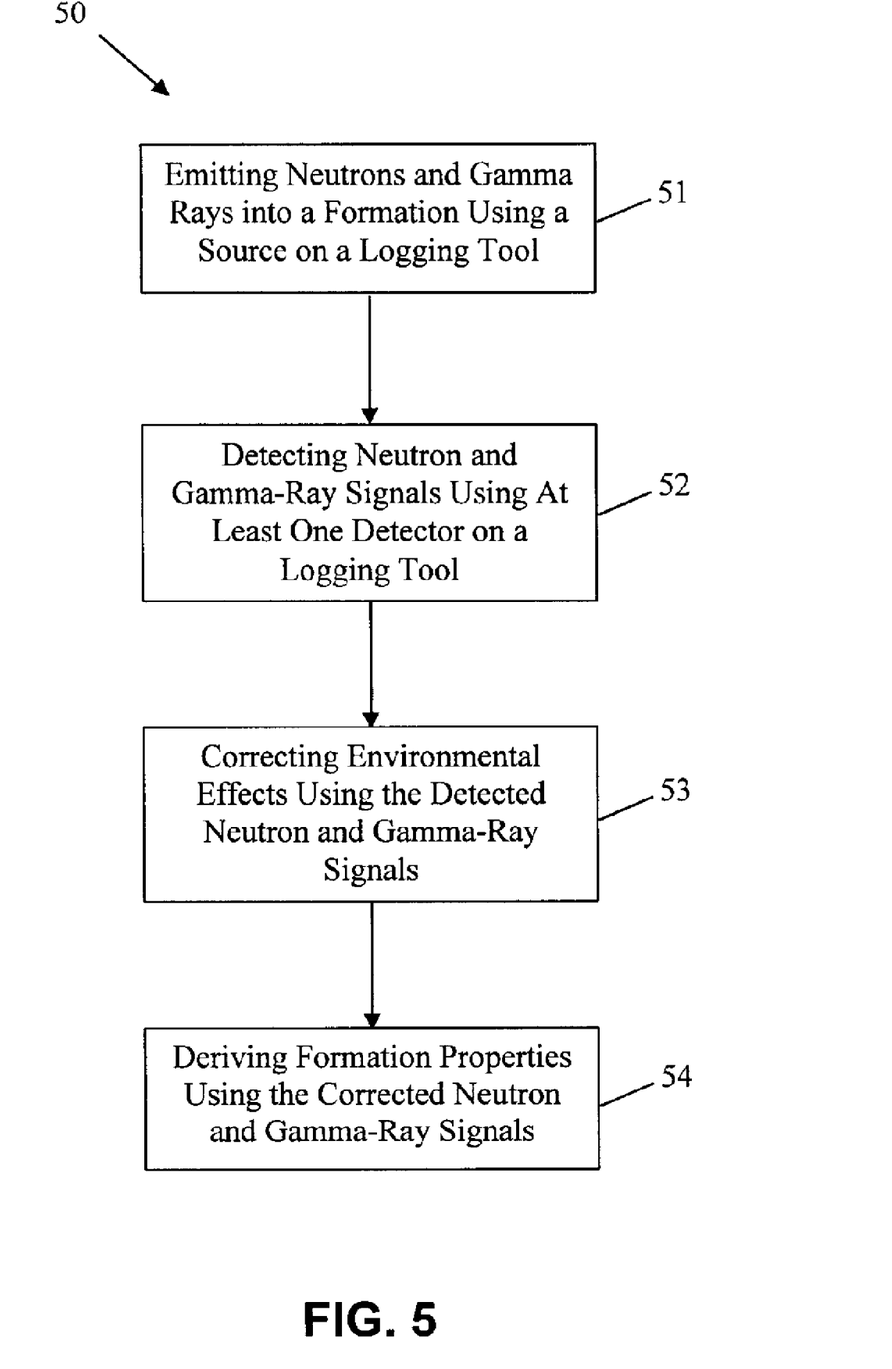
FIG. 5 shows a flow chart illustrating a method of formation logging in accordance with one embodiment of the invention.

Some embodiments of the invention relate to methods for gamma-ray density logging using a single detector. FIG. 5 shows a flow chart illustrating a method in accordance with one embodiment of the invention. As shown, the method 50 comprises the steps of emitting gamma rays and neutrons from a source on a logging tool in a wellbore into a formation (step 51). As noted above, the source in accordance with embodiments of the invention can emit both neutrons and gamma rays. Various configurations of such a source are described above. The emitted neutrons and gamma rays interact with matter in the formation. As a result of these interactions the energies of the neutrons and gamma rays may be reduced. In addition, the interactions also cause these radiations to be scattered, some of which are scattered back to the tool.

The scattered signals are then detected by at least one detector on the same tool (step 52). As noted above, the at least one detector may be a single detector capable of detecting neutrons and gamma rays. Alternatively, the at least one detector may comprise a neutron detector and one or more gamma-ray detectors.

The detected neutron and gamma-ray signals are then analyzed, first to correct environmental effects and then to derive formation properties (step 53). As noted above, the correction of environmental effects may involve using the high-energy gamma-ray signals for correcting near wellbore effects and using the neutron-induced signals for correcting neutron-induced interference in the density measurements. Such correction may use a formation model, as is well known in the art. After corrections, the gamma-ray measurements and the neutron measurements are then used to derive formation properties, including formation density, Pe, and formation porosity, for example, (step 54).

Figure 6:
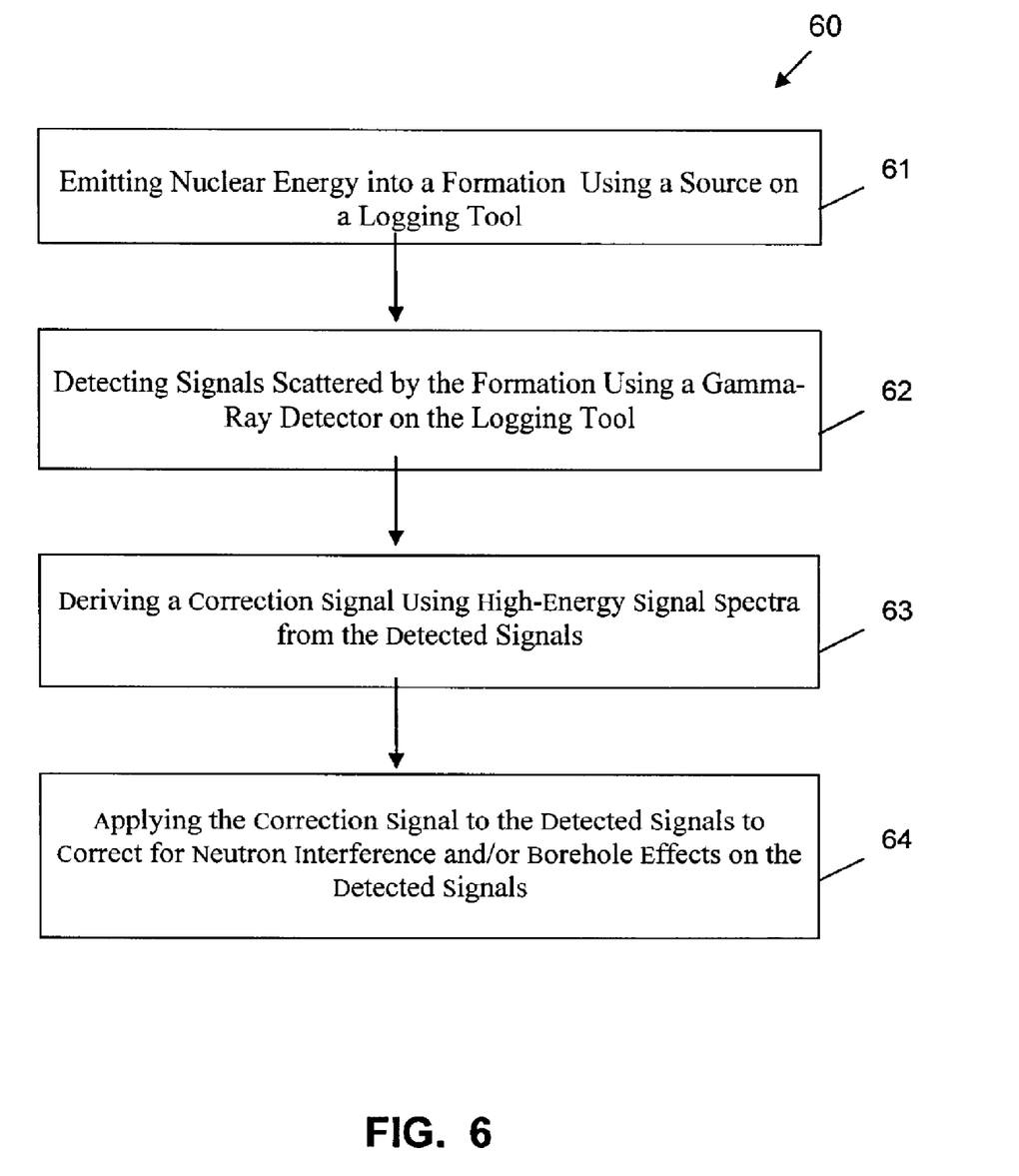
FIG. 6 shows a flow chart illustrating a method of formation logging in accordance with one embodiment of the invention.

Some embodiments of the invention relate to methods for logging using a single gamma-ray detector. FIG. 6 shows a flow chart illustrating a method in accordance with one embodiment of the invention. As shown, the method 60 comprises the steps of emitting nuclear energy from a source on a logging tool in a wellbore into a formation (step 61). As noted above, the source in accordance with embodiments of the invention can emit either neutrons or gamma rays. The emitted energy interacts with matter in the formation. As a result of this interaction the energies of the neutrons or gamma rays may be reduced. In addition, the interaction also causes the radiation signals to be scattered, some of which are scattered back to the tool. The scattered signals are then detected by at least one gamma-ray detector on the tool (step 62).

The detected signals are then analyzed to derive a correction signal using high-energy signal spectra (step 63). As discussed above, by using spectral information at higher energies than the typical density window, yet lower than most neutron-induced gamma rays, a shallow correction signal can be obtained and applied to the deeper signal from the standard density window. The correction signal is applied to the detected signals to correct for neutron interference and/or borehole effects (step 64). Such correction may use a formation model, as is well known in the art. After corrections, the measurements are then used to derive formation properties, including formation density, Pe, and formation porosity, for example.

Advantages of the invention may include one or more of the following. Tools in accordance with embodiments of the invention have significantly reduced weight, length, and costs. These tools have improved reliability and maintenance through the reduction in the number of nuclear detectors. With such tools, it is possible to load only a single source, which might be carried in a single shield, improving safety and reducing operational costs, as compared to the two sources and two source shields typically used now. In wireline environments, both neutron and density measurements might be placed inside a single pad that could be forced against the side of the borehole, producing a measurement much less sensitive to borehole rugosity. In logging-while-drilling environments, the compact size of the measurement package might allow it to be placed inside a single set of short stabilizer blades, reducing tool stiffness and improving driller-friendliness compared to the long, multiple blades currently employed. Depth- and resolution-matching issues that arise in dual-detector measurements and in conventional neutron-density comparisons would be eliminated.

What is claimed is:

1. A method for formation logging, comprising:
   emitting nuclear energy into a formation from within a borehole penetrating the formation;
   detecting gamma rays scattered by the formation as a result of the emitted energy;
   deriving a correction signal using detected gamma rays having energy above a formation density measurement energy range and below a neutron induced gamma ray energy range; and
   applying the correction signal to the detected gamma rays to correct for neutron interference and/or borehole effects on the detected signals.

2. The method of claim 1 wherein a single source emits nuclear energy into the formation.

3. The method of claim 1 wherein the detecting comprises at least two gamma ray detectors.

4. The method of claim 1, further comprising correcting interference environmental effects on the detected gamma ray signals using a portion of the detected gamma-ray signals and detected neutron signals.

5. The method of claim 4, further comprising deriving formation properties from the corrected gamma-ray signals and the detected neutron signals.

6. The method of claim 1, wherein the emitting nuclear energy comprises using a radioactive material that emits gamma rays and neutrons.

7. The method of claim 6, wherein the radioactive material comprises 252Cf.

8. The method of claim 1, wherein the emitting comprises using at least one of an X-ray source and a neutron generator.

9. The method of claim 1, wherein the detecting comprises using a single detector that is sensitive to gamma rays and neutrons.

10. The method of claim 9, wherein the single detector comprises one selected from a GdzSiOs (GSO) scintillator, a cerium-doped GSO scintillator, a RbGdzBr7 scintillator, and a cerium-doped RbGdzBr7 scintillator.

* * * * *